United States Patent Office 2,874,485
Patented Feb. 24, 1959

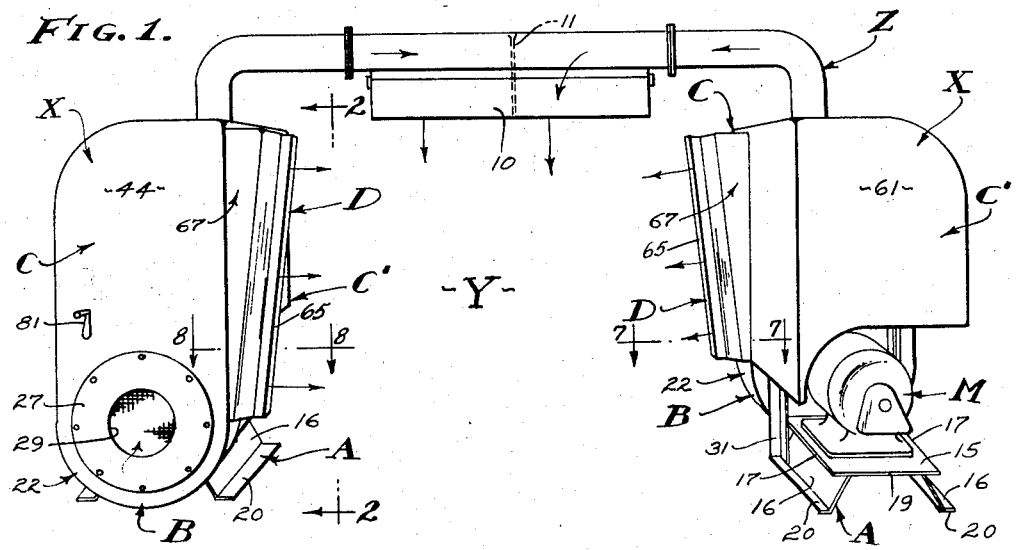

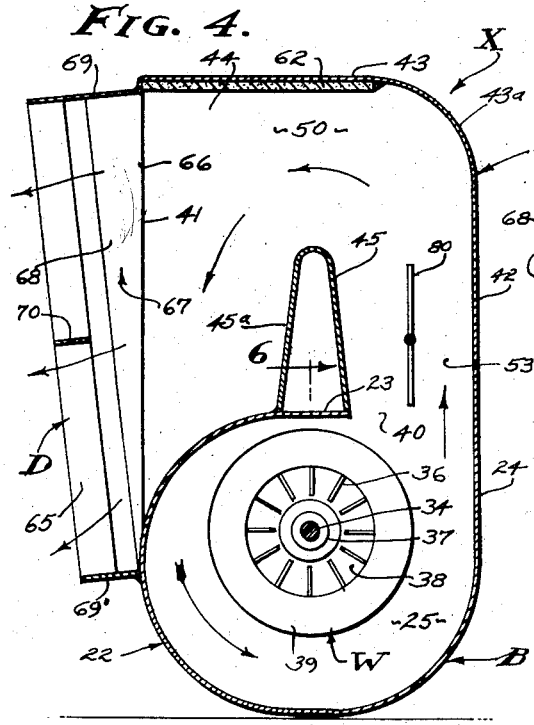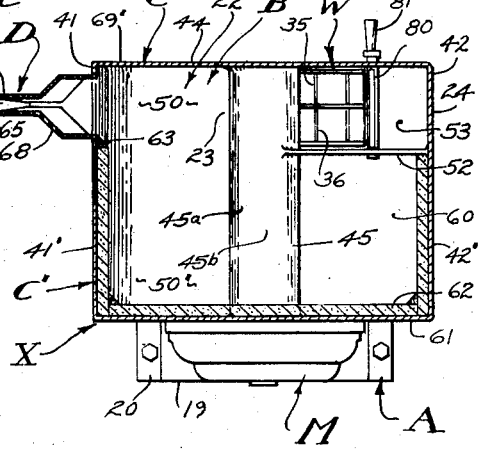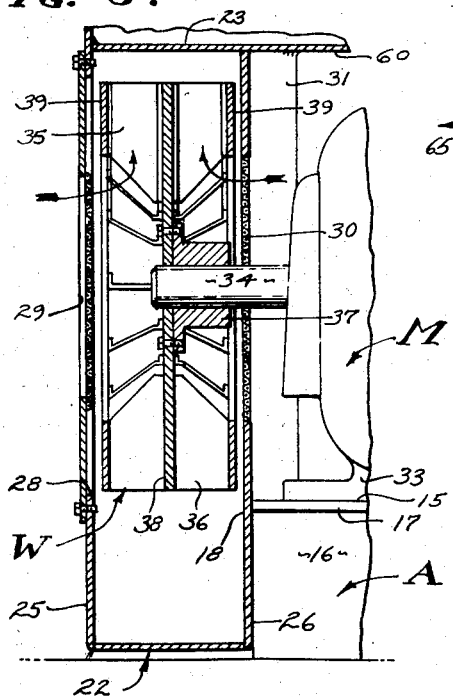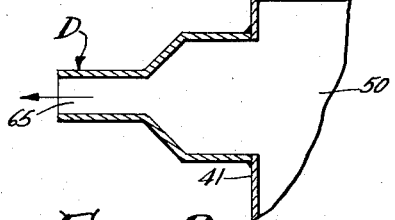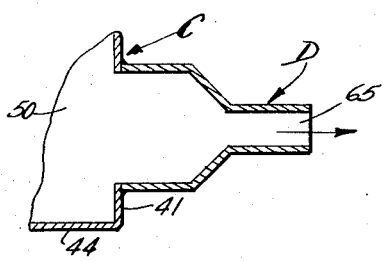
INVENTOR.
EARL E. WILSON
BY
AGENT

2,874,485

AUTOMOBILE DRIER UNIT

Earl E. Wilson, Long Beach, Calif.

Application April 8, 1957, Serial No. 651,498

15 Claims. (Cl. 34—230)

This invention has to do with an automobile drier unit and is particularly concerned with air blowing machinery for use in automobile washing installations, it being a general object of this invention to provide an effective mechanism of the character referred to that blows air against automobile bodies as they travel past the mechanism.

Automobile washing installations involve various degrees of automation. That is, some installations are completely mechanical while others require varying amounts of hand labor. Air blowers are widely used in said installations in place of hand labor in order to dry the automobile bodies after they are cleaned, and these blowers rely upon the circulation of large volumes of air. The air delivered by said blowers, if delivered by said blowers at sufficient velocity, will drive or strip water off of the surface of the automobile bodies.

It will be apparent that high velocity air is much to be desired and that a large volume of air is also required. Further, air blowers of this type employ elongate slot shaped nozzles in order to distribute air over wide surfaces and it is difficult to adequately diffuse the flow of air whereby flow of air is evenly distributed throughout the length of said nozzles.

In view of the foregoing requirements of driers of the type under consideration, it has been found to be difficult to gain the desired result without resorting to large cumbersome machinery. For example, electric motors of 30 to 40 horse power are employed and the proper unrestricted and even distribution of the volume of air driven by said motors usually requires large diffusing chambers, complex baffles, and extensive ducting.

It is an object of the present invention to provide an extremely compact and versatile blower unit for the purpose above referred to that properly handles a large prime mover and which efficiently delivers maximum air per horse power at high velocity and large volume.

It is another object of this invention to provide a blower unit of the type referred to that provides for progressive spreading of the air to the end that even distribution and flow of air occurs at the nozzle of the unit.

It is still another object of the present invention to provide a blower unit of the type herein described that includes means for quieting the operation thereof. The particular air diffuser that I provide is adapted to act as a silencer so that the noise of the fast moving air is deadened to a substantial extent.

Another object of this invention is to decrease the size of the blower unit to a minimum without sacrificing the performance thereof. The machine that I provide is characterized by a dual blower wheel of reduced diameter that is driven by a relatively high speed prime mover. A diffuser receives flow of air from the blower wheel and spreads the air to the end that it is effective throughout the extent of the extensively elongated nozzle of the unit.

Further, it is an object to provide an automobile drier unit of the type herein referred to that is simple and relatively easy and inexpensive to manufacture and which is practical and which is quiet and economical to operate.

The various objects and features of my invention will be fully understood from the following detailed description of a typical preferred form and application of my invention, throughout which description reference is made to the accompanying drawings, in which:

Fig. 1 is a perspective view of the automobile drier of the present invention, showing two units thereof coupled with a header unit. Fig. 2 is an elevational view of one of the drier units shown in Fig. 1 being a view taken as indicated by line 2—2 on Fig. 1. Fig. 3 is a sectional view taken as indicated by line 3—3 on Fig. 2. Fig. 4 is a sectional view taken as indicated by line 4—4 on Fig. 2. Fig. 5 is a plan section taken as indicated by line 5—5 on Fig. 4. Fig. 6 is an enlarged detailed view taken as indicated by line 6—6 on Fig. 4, and Figs. 7 and 8 are enlarged detailed sectional views taken as indicated by lines 7—7 and 8—8 on Fig. 1 and showing the positioning of the nozzles of the automobile drier unit that I provide.

The automobile drier unit X that I provide is clearly illustrated in Fig. 1 of the drawings as being incorporated in a typical installation. The units X are usually employed in pairs, as shown, and are spaced apart to form a passage Y through which automobiles may progress or travel. The units X are vertically disposed units that stand upright from the floor and a header unit Z is supported by the spaced units X to extend therebetween. The two units X are alike and have vertically disposed inwardly directed nozzles, later described, while the header unit Z has a horizontally disposed downwardly directed nozzle 10. The header Z is a duct like element that receives air flow from the two units X, there being a partition 11 at the center of the header Z to separate the flow from the two separate units X. The nozzle 10 is elongate in order to cover the top of the automobile passing through the passage Y, while the nozzles of the units X cover the sides of the automobile. The header Z receives flow of air from the diffusers of the units X, as later described.

The two drier units X are alike and need not be right and left-hand units, or mirror opposites (see Fig. 1). The two drier units X, as shown, are preferably identical and each involves, generally, a mounting base A, a blower housing B carried by the base, a prime mover or motor M supported on the base adjacent the housing, a blower wheel W within the housing and carried on a shaft driven by the motor, a diffuser C carried by the blower housing and receiving flow of air therefrom, and a nozzle D projecting from the diffuser and handling the flow of air to project it laterally of the unit X.

The mounting base A is provided to support the drier unit X on a suitable foundation and may vary somewhat as circumstances require. In the particular form of the invention illustrated the base A involves a platform 15 supported by a pair of legs 16. The platform 15 is a flat horizontally disposed part with parallel edges 17 and ends 18 and 19 normal to the edges. The legs 16 depend from the platform 15 and have foot portions 20 that have supporting engagement with a foundation. The two legs that I have shown at each side of the platform 15 are co-extensive with the platform and terminate at the front end 18 thereof.

The blower housing B is provided to accommodate the blower wheel W, later described, and to direct the flow of air to the diffuser C. The operational axis of the wheel W is horizontal and in accordance with the invention the housing B involves a scroll 22 built or developed about said axis of the wheel W. The scroll 22 is substantially involute relative to the axis of the wheel W having a circumferentially disposed wall that progresses radially outward. As shown, the scroll 22 is of minimum radius at the top center thereof and progressively increases in radius as it extends counter-clockwise to the right-hand side of the structure (see Fig. 4). The scroll is of limited axial extent and is characterized by a horizontally disposed top portion 23 and a vertically disposed side portion 24. The top portion 23 extends clockwise from the top center of the scroll 22, while the side portion 24 continues counter clockwise from the right side of the scroll 22 tangent thereto.

The housing B includes front and back walls 25 and 26 that join with the scroll 22 to form an enclosure for housing the wheel W. The walls 25 and 26 are flat parallel walls spaced apart by the scroll 22 and joined to the edges of the scroll as by welding, or the like. A cover 27 is provided in the front wall 25, the cover being a circular part covering an opening 28 in the front wall. The opening 28 is slightly larger in diameter than the blower wheel W in order to permit entry of said wheel into the housing B. The housing B is provided with inlet openings 29 and 30 in the cover 27 and back wall 26, respectively. The openings 29 and 30 are concentric with the axis of the wheel and are of sufficient size to accommodate the desired flow of intake air. Note, that the opening 30 is slightly larger than the opening 29 in order to compensate for the area occupied by the shaft of the motor M. Suitable screens occupy and protect the openings.

In accordance with the invention the back wall 26 of the housing B is secured to the forward end of the base A. That is, the terminal front end 18 of the platform 15 and front ends of the legs 16 join the back wall 26 of the housing to have supporting engagement therewith. Further, braces 31 are provided at either side of the opening 30 in the back wall, the braces 31 being in the form of stiffeners that are vertically disposed and which may be secured to the back wall 26 throughout their vertical extent, as indicated. The housing B may be secured to the base A as by welding, or the like.

The prime mover or motor M may vary widely as circumstances require. It is practical, however, to employ an electric motor M supplied by current through a suitable cable 32. The motor M is secured to the platform 15 and has a frame 33 and a drive shaft 34 projecting from the forward end thereof. The shaft 34 is concentric with the openings 29 and 30 and extends into the housing B through the opening 30.

The blower wheel W is employed to circulate or drive air through the housing B and is a dual wheel having two oppositely faced sets of air driving vanes 35 and 36. The wheel W involves a hub 37 carried on the shaft 34, and a disc 38 on the hub 37 and adapted to carry the vanes 35 and 36. The vanes 35 are shown on the front side of the disc 38 while the vanes 36 are shown on the back side of the disc 38. The vanes 35 and 36 are circumferentially spaced and are radially disposed to drive air by centrifugal action. Further, rings 39 are employed to reinforce the vanes at the front and back of the wheel W, the rings being flat elements with central openings therein to pass incoming air. It will be apparent how the wheel W, aligned with the openings 29 and 30 in the housing B, will deliver air when the wheel W is rotated by the motor M.

In accordance with the present invention, I have provided the diffuser C that receives flow of air from the housing B and handles it so that it is efficiently delivered to the nozzle D. As shown, an outlet opening 40 is provided in the top portion 23 of the scroll 22 so that flow of air is directed vertically from the housing B at one side, or right-hand side thereof, as shown in Fig. 4. The diffuser C overlies the housing B, the scroll 22 forming the bottom of the diffuser, and it involves, generally, side walls 41 and 42, a top wall 43, a front wall 44, and a baffle 45. The walls 41 and 42 are spaced apart to be tangent with the scroll 22 at the sides of the housing B and are straight vertically disposed walls. The top wall 43 joins the upper ends of the side walls, and the front wall 44 joins with the forward edges of the side and top walls to close the front of the structure forming a chamber 50. Further, the front wall 44 is shaped or extended downwardly to join with the housing B at the scroll 22 to form a continuation of the front wall 25 thereof, and it is rounded at 43a to turn and direct flow of air transversely of the chamber 50.

A feature of the construction is the utilization of the scroll 22 to form the bottom of the diffuser chamber 50, and in practice the back wall 26 of the housing B is extended upwardly at 52 to form a delivery duct 53 that extends vertically to discharge air upwardly into the chamber 50. The baffle 45 is spaced from the side 42 of the diffuser and is substantially vertically disposed, and joins with the extended wall at 52 to define the duct 53. The said duct 53 is of limited vertical extent while the baffle 45 continues upward to approximately one-half the height of the chamber.

A feature of the present invention is that the baffle 45 diverges from the side wall 42 in the direction of the air flow to the end that the air is spread progressively in a gradual manner. In practice, the baffle is double walled and has a portion 45a spaced from the side 41 of the diffuser C. The portion 45a is faired into the baffle 45 by a rounded ridge 45b and extends downwardly to join with the bottom of the diffuser. Further, the portion 45a slants or pitches toward the side wall 41 as it extends downwardly.

As best illustrated in Fig. 2 of the drawings, the diffuser C is provided with an extension C'. The extension C' has, primarily, two purposes, i. e., to provide for an outlet E for accommodation of the header unit Z, and to have a silencing action. The extension C' involves side walls 41' and 42' forming continuations of the walls 41 and 42, and a top wall 43' forming a continuation of the wall 43. In addition to the walls 41' and 42' the extension involves a bottom 60 that extends horizontally in the plane of the top portion 23 of the scroll 22. The bottom 60 has a curved portion 60a forming a continuation of the wall of the scroll 22, as shown. The extension C' is of substantial horizontal extent and is closed at the back thereof by a wall 61. It will be apparent how the extended walls with the bottom 60 and back 61 form a chamber 50' which is in effect a continuation of the chamber 50. Further, the baffle 45 and parts 45a and 45b are also extended to join with the back 61 of the diffuser extension C'.

As shown throughout the drawings, the greater part of the chambers 50 and 50' are lined with sound absorbing material. The acoustical lining 62 that I provide may be of any reasonably hard material that will not abrade when subjected to high air velocities and may be of substantial thickness. The lining 62 is cemented in place and fillets 63 are provided at the edges thereof to prevent lifting of the edges of the lining.

The outlet or bleed opening E is provided in the top extension wall 43' and is a simple opening adapted to mate with the duct of the header unit Z. The outlet E is offset from the chamber 50 and receives air flow from the axially extended chamber 50'.

The nozzle D projects from the diffuser and handles the flow of air to project or direct it laterally of the unit X. The nozzle D is a vertically disposed elongate element with a narrow slot-like aperture 65 that is substantially coextensive with the overall height of the structure. That is, the opening 65 is of maximum length or height and extends from the top of the diffuser C to the bottom thereof at or near the base A. The nozzle projects laterally from the diffuser, preferably from the wall 41 thereof so that air flowing transversely of the chamber 50 is discharged to the side of the unit X. In the case illustrated the air is discharged from the left-hand side of the structure (see Fig. 4).

In the form of the invention illustrated the wall 41 of the diffuser C is provided with an opening 66 substantially coextensive with the height and width thereof. The nozzle D involves a duct 67 that overlies the opening 66 and joins to the wall 41 to receive air from the chamber 50. The duct 67 is rectangular in cross sectional configuration and has closely spaced side walls 68 and remotely spaced top and bottom walls 69 and 69'. The side walls 68 converge toward the aperture 65 of the desired width in order to have the required jet action. In practice, the center portion of the walls 68 are spaced apart by means of a strut 70 slightly to increase the flow of air at the center of the nozzle D. Further, it is usually desired to direct the flow of air downwardly at a slight angle, in which case the nozzle D is pitched laterally at the top end thereof so that the jet aperture 65 opens somewhat downwardly.

As is common practice, it is sometimes desired to direct the flow of air somewhat axially as well as downwardly, in which case the nozzle D on one unit X is turned axially in one direction relative to said unit X while the nozzle D on the other unit X is turned axially in the other direction relative to said unit X. Thus, with the nozzles angularly disposed the units X used at opposite sides of the passage Y will direct the flow of air axially in one direction relative to said passage. It will be apparent that the nozzles may be turned and secured in any desired fixed angular position. Further, the nozzle of the structure may be satisfactorily placed at any desired point lengthwise of the diffuser C and extension C' thereof, to project from the wall 41 or 41' as the case may be.

From the foregoing it will be readily seen that I have provided a new and improved drier unit for use in automobile washing installations. The particular machines that I provide in accordance with this invention are compact and efficient in operation. A minimum of space is used in the installation of the blower structure that I provide and a maximum volume and velocity of air is delivered commensurate with the horse power consumed. In carrying out the invention a valve 80 is provided in the duct 43 in order to shut off flow of air when desired. A control lever 81 positions the valve 80 and when the valve 80 is closed the torque on the blower wheel W is reduced resulting in reduced current consumption of the motor M. Since large motors are employed, it is desirable to reduce the power in this way rather than start and stop the motor M with complicated switches and starting devices.

Having described my invention, I do not wish to be limited to or restricted to the specific details herein set forth, but wish to reserve to myself any variations or modifications that may appear to those skilled in the art and fall within the scope of the following claims.

Having described my invention, I claim:

1. A drier unit of the character described including, a blower housing, a blower wheel carried in said housing on a horizontally and longitudinally disposed axis, said housing having a scroll adapted to discharge air vertically at one side of the housing, a diffuser overlying the blower housing and with a chamber receiving said air therefrom to direct it transversely of said axis, and a nozzle in communication with the diffuser chamber and with an elongate vertically disposed slot-shaped aperture at the side thereof opposite the discharge side of the blower housing and disposed to project said air laterally of the unit.

2. A drier unit of the character described including, a blower housing, a blower wheel carried in said housing on a horizontally and longitudinally disposed axis, said housing having a scroll adapted to discharge air vertically at one side of the housing, a diffuser overlying the blower housing and with a chamber receiving said air therefrom to direct it transversely of said axis, said scroll forming the bottom of the diffuser, and a nozzle in communication with the diffuser chamber and with an elongate vertically disposed slot-shaped aperture at the side thereof opposite the discharge side of the blower housing and substantially coextensive with the height of the unit and disposed to project said air laterally of the unit.

3. A drier unit of the character described including, a blower housing, a blower wheel carried in said housing on a horizontally and longitudinally disposed axis, said housing having an involutely shaped scroll adapted to discharge air vertically at one side of the housing and with a downwardly curved portion at the other side of the housing, a diffuser overlying the blower housing and with a chamber receiving said air therefrom to direct it transversely of said axis, the said downwardly curved portion of the scroll forming the transversely extending bottom of the diffuser, and a nozzle in communication with the diffuser chamber and with an elongate vertically disposed slot-shaped aperture at the side thereof opposite the discharge side of the blower housing and coextensive with the diffuser and disposed to project said air laterally of the unit.

4. A drier unit of the character described including, a blower housing having spaced front and back walls with air inlet openings therein, a blower wheel carried in said housing on a horizontally and longitudinally disposed axis and having oppositely faced vanes receiving air from the said inlet openings respectively, said housing having a scroll adapted to discharge air vertically at one side of the housing, a diffuser overlying the blower housing and with a chamber receiving said air therefrom to direct it transversely of said axis, and a nozzle in communication with the diffuser chamber and with an elongate vertically disposed slot-shaped aperture at the side thereof opposite the discharge side of the blower housing and disposed to project said air laterally of the unit.

5. A drier unit of the character described including, a blower housing having spaced front and back walls with air inlet openings therein, a blower wheel carried in said housing on a horizontally and longitudinally disposed axis and having oppositely faced vanes receiving air from the said inlet openings respectively, said housing having a scroll adapted to discharge air vertically at one side of the housing, a diffuser overlying the blower housing and with a chamber receiving said air therefrom to direct it transversely of said axis, said scroll forming the transversely extending bottom of the diffuser, and a nozzle in communication with the diffuser chamber and with an elongate vertically disposed slot-shaped aperture at the side thereof opposite the discharge side of the blower housing and substantially coextensive with the height of the unit and disposed to project said air laterally of the unit.

6. A drier unit of the character described including, a blower housing having spaced front and back walls with air inlet openings therein, a blower wheel carried in said housing on a horizontally and longitudinally disposed axis and having oppositely faced vanes receiving air from the said inlet openings respectively, said housing having an involutely shaped scroll adapted to discharge air vertically at one side of the housing and with a downwardly curved transversely extending portion at the other side of the housing, a diffuser overlying the blower housing and with a chamber receiving said air therefrom to direct it transversely of said axis, the said curved portion of the scroll forming the transversely extending bottom of the diffuser, and a nozzle in communication with the diffuser chamber and with an elongate vertically disposed slot-shaped aperture at the side thereof opposite the discharge side of the blower housing and coextensive with the diffuser and disposed to project said air laterally of the unit.

7. A drier unit of the character described including a blower housing, a blower wheel carried in said housing on a horizontally and longitudinally disposed axis, said housing having a scroll adapted to discharge air vertically at one side of the housing, a diffuser overlying the blower housing and with a chamber receiving said air therefrom to direct it transversely of said axis, said diffuser having a longitudinal extension offset from the axis of the blower wheel and extending said chamber, and a nozzle in communication with the extended diffuser chamber and with an elongate vertically disposed slot-shaped aperture at the side thereof opposite the discharge side of the blower housing and disposed to project said air laterally of the unit.

8. A drier of the character described including, a blower housing, a blower wheel carried in said housing on a horizontally and longitudinally disposed axis, said housing having a scroll adapted to discharge air vertically at one side of the housing, a diffuser overlying the blower housing and with a chamber receiving said air therefrom to direct it transversely of said axis, said diffuser having a longitudinal extension offset from the axis of the blower wheel and extending said chamber to silence the operation of the unit, and a nozzle in communication with the extended diffuser chamber and with an elongate vertically disposed slot-shaped aperture at the side thereof opposite the discharge side of the blower housing and disposed to project said air laterally of the unit.

9. A drier unit of the character described including, a blower housing, a blower wheel carried in said housing on a horizontally and longitudinally disposed axis, said housing having a scroll adapted to discharge air vertically at one side of the housing, a diffuser overlying the blower housing and with a chamber receiving said air therefrom to direct it transversely of said axis, said diffuser having a longitudinal extension offset from the axis of the blower wheel to extend said chamber and with a sound absorbing lining adapted to silence the operation of the unit, and a nozzle in communication with the extended diffuser chamber and with an elongate vertically disposed slot-shaped aperture at the side thereof opposite the discharge side of the blower housing and disposed to project said air laterally of the unit.

10. A drier unit of the character described including, a blower housing, a blower wheel carried in said housing on a horizontally and longitudinally disposed axis, said housing having a scroll adapted to discharge air vertically at one side of the housing, a diffuser overlying the blower housing and with a chamber receiving said air therefrom to direct it transversely of said axis, said diffuser having a longitudinal extension offset from the axis of the blower wheel to extend said chamber and having a bleed opening therein adapted to withdraw air from the diffuser without interfering with the normal flow of air therethrough, and a nozzle in communication with the extended diffuser chamber and with an elongate vertically disposed slot-shaped aperture at the side thereof opposite the discharge side of the blower housing and disposed to project said air laterally of the unit.

11. A drier unit of the character described including, a blower housing, a blower wheel carried in said housing on a horizontally and longitudinally disposed axis, said housing having a scroll adapted to discharge air vertically at one side of the housing, a diffuser overlying the blower housing and with a chamber receiving said air therefrom to direct it transversely of said axis, said diffuser having a longitudinal extension offset from the axis of the blower wheel to extend said chamber and with a bottom in a plane substantially coincidental with the top portion of the scroll, said scroll forming the bottom of the diffuser, and a nozzle in communication with the extended chamber and with an elongate vertically disposed slot-shaped aperture at the side thereof opposite the discharge side of the blower housing and substantially coextensive with the height of the unit and disposed to project said air laterally of the unit.

12. A drier unit of the character described including, a blower housing, a blower wheel carried in said housing on a horizontally and longitudinally disposed axis, said housing having an involutely shaped scroll adapted to discharge air vertically at one side of the housing and with a transverse downwardly curved portion at the other side of the housing, a diffuser overlying the blower housing and with a chamber receiving said air therefrom to direct it transversely of said axis, said diffuser having a longitudinal extension offset from the axis of the blower wheel to extend said chamber and with a bottom in a plane coincidental with the top part of the said curved portion of the scroll, the said curved portion of the scroll forming the bottom of the diffuser, and a nozzle in communication with the extended diffuser chamber and with an elongate vertically disposed slot-shaped aperture at the side thereof opposite the discharge side of the blower housing and coextensive with the diffuser and disposed to project said air laterally of the unit.

13. A drier unit of the character described including, a blower housing having spaced front and back walls with air inlet openings therein, a blower wheel carried in said housing on a horizontally and longitudinally disposed axis and having oppositely faced vanes receiving air from the said inlet openings respectively, said housing having a scroll adapted to discharge air vertically at one side of the housing, a diffuser overlying the blower housing and with a chamber receiving said air therefrom to direct it transversely of said axis, said diffuser having a longitudinal extension offset from the axis of the blower wheel to extend said chamber and with a bottom in a plane substantially coincidental with the top portion of the scroll, and a nozzle in communication with the extended diffuser chamber and with an elongate vertically disposed slot-shaped aperture at the side thereof opposite the discharge side of the blower housing and disposed to project said air laterally of the unit.

14. A drier unit of the character described including, a blower housing having spaced front and back walls with air inlet openings therein, a blower wheel carried in said housing on a horizontally and longitudinally disposed axis and having oppositely faced vanes receiving air from the said inlet openings respectively, said housing having a scroll adapted to discharge air vertically at one side of the housing, a diffuser overlying the blower housing and with a chamber receiving said air therefrom to direct it transversely of said axis, said diffuser having a longitudinal extension offset from the axis of the blower wheel to extend said chamber and with a bottom in a plane substantially coincidental with the top portion of the scroll, said scroll forming the bottom of the diffuser and a nozzle in communication with the extended diffuser chamber and with an elongate vertically disposed slot-shaped aperture at the side thereof opposite the discharge side of the blower housing and substantially coextensive with the height of the unit and disposed to project said air laterally of the unit.

15. A drier unit of the character described including, a blower housing having spaced front and back walls with air inlet openings therein, a blower wheel carried in said housing on a horizontally and longitudinally disposed axis, and having oppositely faced vanes receiving air from the said inlet openings respectively, said housing having an involutely shaped scroll adapted to discharge air vertically at one side of the housing and with a transversely extending downwardly curved portion at the other side of the housing, a diffuser overlying the blower housing and with a chamber receiving said air therefrom to direct it transversely of said axis, said diffuser having a longitudinal extension offset from the axis of the blower wheel to extend said chamber and with a bottom with a portion in a plane substantially coincidental with the top portion of the scroll, the said curved portion of the scroll forming the bottom of the diffuser and the extension bottom continuing therefrom, and a nozzle in communication with the extended diffuser chamber and with an elongate vertically disposed slot-shaped aperture at the side thereof opposite the discharge side of the blower housing and coextensive with the diffuser and disposed to project said air laterally of the unit.

References Cited in the file of this patent

UNITED STATES PATENTS

| | | |
|---|---|---|
| 1,364,777 | Martin | Jan. 4, 1921 |
| 2,132,303 | Lathrop | Oct. 4, 1938 |
| 2,375,920 | Hewitt | May 15, 1945 |
| 2,758,392 | Vani et al. | Aug. 14, 1956 |
| 2,770,496 | Wilson | Nov. 13, 1956 |